US008507393B2

(12) United States Patent
Park et al.

(10) Patent No.: US 8,507,393 B2
(45) Date of Patent: Aug. 13, 2013

(54) LOW TEMPERATURE CO-FIRED CERAMICS WITH LOW DIELECTRIC LOSS FOR MILLIMETER-WAVE APPLICATION

(75) Inventors: Jeong Hyun Park, Seoul (KR); Jin Gu Kang, Seoul (KR); Young Jin Choi, Seoul (KR); Jae Gwan Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 112 days.

(21) Appl. No.: 13/098,937

(22) Filed: May 2, 2011

(65) Prior Publication Data

US 2012/0202675 A1 Aug. 9, 2012

(30) Foreign Application Priority Data

Feb. 8, 2011 (KR) ........................ 10-2011-0011277

(51) Int. Cl.
*C03C 14/00* (2006.01)

(52) U.S. Cl.
USPC ............................................... 501/32; 501/17

(58) Field of Classification Search
USPC ...................................................... 501/32, 17
See application file for complete search history.

(56) References Cited

U.S. PATENT DOCUMENTS 4,593,006 A * 6/1986 Takabatake et al. ............ 501/32
5,242,867 A * 9/1993 Lin et al. ......................... 501/32
5,258,335 A 11/1993 Muralidhar et al.
5,902,758 A 5/1999 Hazeyama et al.
6,835,682 B2 12/2004 Cho et al.
7,160,823 B2 1/2007 Park et al.

FOREIGN PATENT DOCUMENTS

JP 05311097 * 11/1993
JP 2005035849 * 2/2005
JP 2010006690 * 1/2010
KR 1020030042957 6/2003
KR 1020060108283 10/2006

* cited by examiner

*Primary Examiner* — Karl Group
(74) *Attorney, Agent, or Firm* — Lowe Hauptman Ham & Berner, LLP

(57) ABSTRACT

Provided is a dielectric ceramic composition comprising: 40-70 wt % of a borosilicate-based glass frit comprising 50-80 mol % of $SiO_2$, 15-20 mol % of $B_2O_3$, 0.1-5 mol % of one or more alkali metal oxide selected from $Li_2O$ and $Na_2O$, and 0.1-30 mol % of one or more alkaline earth metal oxide selected from MgO, CaO, SrO and ZnO; and 30-60 wt % of a ceramic filler represented by Chemical Formula 1:

$$(Zn_{1-x}Mg_x)_2SiO_4 \quad (1)$$

wherein $0 \leqq x \leqq 1$.

The disclosed low temperature co-fired ceramic (LTCC) composition is sinterable at low temperature, with a relative density of at least 95% in the temperature range of 800-900° C., is capable of minimizing electric loss, with a dielectric constant of 4-7 and a very low dielectric loss, and is applicable from the low-frequency band to the millimeter-wave band of 60 GHz or more.

5 Claims, 3 Drawing Sheets

Preparation Example 4
1
$CaO-B_2O_3-SiO_2$
2
$SiO_2-B_2O_3$
$MgO-CaO-B_2O_3-SiO_2$
3

Preparation Example 8
1
$SiO_2-B_2O_3$
2
$MgO-CaO-SiO_2$

LOW TEMPERATURE CO-FIRED CERAMICS WITH LOW DIELECTRIC LOSS FOR MILLIMETER-WAVE APPLICATION

CROSS-REFERENCE TO RELATED APPLICATIONS

This application claims priority under 35 U.S.C. §119 to Korean Patent Application No. 10-2011-0011277 filed Feb. 8, 2011 with the Korean Intellectual Property Office, the disclosure of which is incorporated herein by reference in its entirety.

BACKGROUND (a) Technical Field

The present invention relates to a low temperature co-fired ceramic (LTCC) composition with low dielectric loss for millimeter-wave application.

(b) Background Art

Wireless communication technology has been recently expanding its territory from simple voice communication services to complex and various multimedia services including video broadcasting, video telephone and file transfer. Although the millimeter wave bands of the extremely high frequency region have been reserved for special wireless communications including military use, the competition and saturation in the GHz frequency region requires their extension to millimeter wave bands such as 60 GHz. The use of the frequency region is expected to increase further in the future.

At present, leading companies in this field including DuPont, Ferro, Heraeus, and Kyocera have been developing dielectric materials and components for electronic devices using the millimeter-wave frequencies. DuPont and Ferro have already acquired essential techniques on various low temperature co-fired ceramic (LTCC) compositions. Particularly, DuPont's DP 943 dielectric tape and Ferro's A6 dielectric tape are thought as key materials for millimeter-wave application by many passive component producers. IMST of Germany and VTT of Finland also have technologies vital to components for millimeter-wave applications, including high-level integration modules for LMDS in the 24-GHz band, radar sensors for vehicles in the 77-GHz band, or the like. Heraeus is currently developing dielectric materials for the extremely high frequency band based on its own technology in the field of new materials. In Japan, NEC has developed a wireless-HD transceiver using a dielectric material for millimeter-wave application with extremely low loss. Hitachi announced that it has completed the development of a radar transceiver for vehicles in the 77 GHz band. Kyocera has been selected as Intel's WiMAX RF FEM provider with its high temperature coefficient of expansion (TCE) LTCC technology.

The LTCC technology is a key technology in developing dielectric materials for millimeter-wave application. The core of the LTCC technology for production of miniaturized, high-functionality electronic devices is to realize an integrated, modularized circuit board. The LTCC dielectric material is sintered at low temperature of 950° C. or less, thus enabling to use silver (Ag) as an internal electrode. This can reduce the cost as compared to the internal electrode made of expensive precious metal such as platinum (Pt) while providing better electric conductivity. To allow the sintering at low temperature, the sintering temperature of the ceramic dielectric material needs to be lowered. In general, glass frit is used for this purpose. Low dielectric loss is particularly required for a dielectric composition for millimeter-wave application. However, since the addition of glass frit results in a low quality factor in most cases, the addition amount of the glass frit is restricted.

The commercially available glass frit compositions used as LTCC dielectric compositions include: the anorthite ($CaMgSi_2O_6$)-based glass composition developed by Motorola, the calcium borosilite-based glass composition of Ferro, and the lead borosilicate-based glass composition of DuPont are typical examples. These glass frit materials are not marketed alone but incorporated into LTCC dielectric compositions. In order to reduce dielectric loss of these dielectric compositions, the glass is crystallized or it is mixed with a dielectric ceramic filler with high quality factor. Examples of the dielectric ceramic filler with high quality factor include oxide compounds such as $MgAl_2O_4$, $ZnAl_2O_4$, etc.

Korean Patent No. 0704318 describes an LTCC dielectric composition with low dielectric loss, including 15-55 wt % of one or more oxide filler selected from $ZnAl_2O_4$, $MgAl_2O_4$, $ZrSiO_4$ and $Mg_2SiO_4$, having a high quality factor at 1 MHz. It is described that samples prepared from the composition have a dielectric constant 4-7, a dielectric loss of 0.02-0.2% and a quality factor of 500-5000, at 1 MHz.

Korean Patent Application Publication No. 2003-0042957 describes that $CaWO_4$—$Mg_2SiO_4$ can be used as a dielectric ceramic filler in the millimeter wave band. Similar dielectric materials with a low dielectric constant are described for example in U.S. Pat. Nos. 6,835,682; 5,258,335; 5,902,758; and 7,160,823.

SUMMARY

The present invention relates to a low-dielectric-constant dielectric composition for low temperature sintering for millimeter-wave application, which is sinterable at 900° C. or below. The present invention aims at providing a low-dielectric-constant dielectric composition having a dielectric constant of 4-7, a quality factor of at least 5,000 at 1 MHz, at least 800 at 10 GHz or above, and at least 400 at 60 GHz or above.

In one general aspect, the present invention provides a dielectric ceramic composition comprising: 40-70 wt % of a borosilicate-based glass frit including 50-80 mol % of $SiO_2$, 15-20 mol % of $B_2O_3$, 0.1-5 mol % of one or more alkali metal oxide selected from $Li_2O$ and $Na_2O$, and 0.1-30 mol % of one or more alkaline earth metal oxide selected from MgO, CaO, SrO and ZnO; and 30-60 wt % of a ceramic filler represented by Chemical Formula 1:

$$(Zn_{1-x}Mg_x)_2SiO_4 \qquad (1)$$

wherein x is $0 \leqq x \leqq 1$.

The low temperature co-fired ceramic (LTCC) composition provided by the present invention is sinterable at low temperature, with a relative density of at least 95% in the temperature range of 800-900° C., is capable of minimizing electric loss, with a dielectric constant of 4-7 and a very low dielectric loss, and is applicable from the low-frequency band to the millimeter-wave band of 60 GHz or more.

Since the low-dielectric-constant dielectric ceramic composition for millimeter-wave application of the present invention is useful as a material for transceiver modules of 60-GHz wireless HDMI, HDTV, car radar, or the like for complex and various multimedia services including video broadcasting, video telephone and file transfer in the 60-, 77- and 94-GHz broadband, its market is expected to grow consistently.

The above and other aspects and features of the present invention will be described infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the disclosure, and wherein.

DETAILED DESCRIPTION

Figure 1:
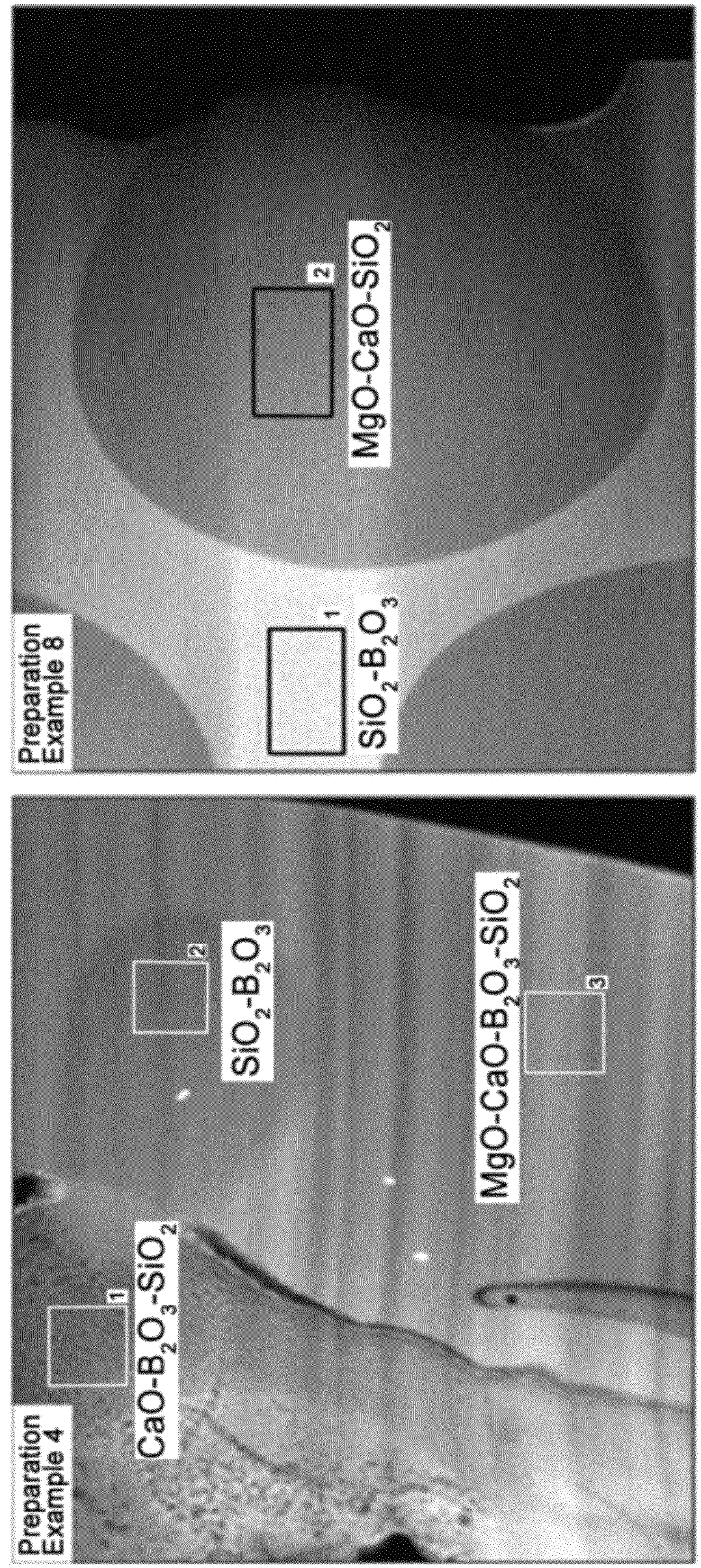
FIG. 1 shows scanning electron microscopic (SEM) images of the compositions prepared in Preparation Examples 4 and 8.

Hereinafter, reference will now be made in detail to various embodiments of the present invention, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present invention provides a dielectric ceramic composition comprising: 40-70 wt % of a borosilicate-based glass frit comprising 50-80 mol % of $SiO_2$, 15-20 mol % of $B_2O_3$, 0.1-5 mol % of one or more alkali metal oxide selected from $Li_2O$ and $Na_2O$, and 0.1-30 mol % of one or more alkaline earth metal oxide selected from MgO, CaO, SrO and ZnO; and 30-60 wt % of a ceramic filler represented by Chemical Formula 1:

$$(Zn_{1-x}Mg_x)_2SiO_4 \quad (1)$$

wherein x is $0 \leqq x \leqq 1$.

The low temperature co-fired ceramic (LTCC) composition provided by the present invention is sinterable at low temperature, with a relative density of at least 95% in the temperature range of 800-900° C., is capable of minimizing electric loss, with a dielectric constant of 4-7 and a very low dielectric loss, and is applicable from the low-frequency band to the millimeter-wave band of 60 GHz or more.

The borosilicate-based glass frit may comprise 40-70 wt % of a borosilicate-based glass frit comprising 50-80 mol % of $SiO_2$, 15-20 mol % of $B_2O_3$, 0.1-5 mol % of one or more alkali metal oxide selected from $Li_2O$ and $Na_2O$, and 0.1-30 mol % of one or more alkaline earth metal oxide selected from MgO, CaO, SrO and ZnO. The borosilicate-based glass frit may further comprise 0.1-5 mol % of $Al_2O_3$.

In order to minimize dielectric loss of the dielectric composition, a high-melting-point borosilicate-based glass frit comprising 65 mol % or more of $SiO_2$ and $B_2O_3$ combined as main components and having the smallest dielectric loss is used as the glass frit. Here, 0.1-30 mol % of one or more alkaline earth metal oxide selected from MgO, CaO, SrO and ZnO is added to induce crystallization in the glass. And, one or more alkali metal oxide selected from $Li_2O$ and $Na_2O$ is added in an amount of 0.1-5 mol % since it lowers softening temperature of the glass and improves viscous flow but increases dielectric loss.

In the present invention, $(Zn_{1-x}Mg_x)_2SiO_4$ ($0 \leqq x \leqq 1$) is used as a filler. A dielectric composition comprising $Zn_2SiO_4$ has superior dielectric properties with a dielectric constant of 6.6 and a quality factor (Q×f) of 219,000 (10-15 GHz) and is sinterable at a relative low temperature of about 1340° C., but it has unsatisfactory chemical resistance. A dielectric composition comprising $Mg_2SiO_4$ has good dielectric properties with a dielectric constant of 6.8 and a quality factor (Q×f) of 270,000 (10-15 GHz), but the sintering temperature is as high as 1400° C. Accordingly, a dielectric composition comprising a solid solution of the two dielectric ceramics $(Zn_{1-x}Mg_x)_2SiO_4$ ($0<x<1$) prepared at 1000-1500° C. may be used.

The filler may be added in the amount of 30-60 wt %. When the filler is added in an amount exceeding 60 wt %, the samples do not show optimized fineness, with a relative density of 95% or less. And, when the filler is added in an amount less than 30 wt %, the $(Zn_{1-x}Mg_x)_2SiO_4$ ($0 \leqq x \leqq 1$) phase providing superior dielectric properties disappears and a quartz ($SiO_2$) phase appears. Since the quartz ($SiO_2$) phase provides unsatisfactory strength and dielectric properties as compared to the $(Zn_{1-x}Mg_x)_2SiO_4$ ($0 \leqq x \leqq 1$) phase, strength and dielectric properties become unsatisfactory.

When a filler represented by $(Zn_{1-x}Mg_x)_2SiO_4$ ($0<x<1$) is used to prepare the dielectric ceramic composition, sintering may be carried out at low temperature of 900° C. or below without defects. When $(Zn_{1-x}Mg_x)_2SiO_4$ ($0<x<1$) is used, the divalent cations $Zn^{2+}$ and $Mg^{2+}$ compete for the same sites and result in change of physical properties. As a result, even when general glass frit, not the crystallized glass frit, is used for low temperature sintering, deposition of the secondary phase resulting from phase separation may be minimized and the degradation of the dielectric properties of the filler may be minimized, thus allowing preparation of the LTCC composition having a high quality factor.

$Al_2O_3$ may be added in an amount of 3-15 parts by weight based on 100 parts by weight of the dielectric ceramic composition. The added $Al_2O_3$ reacts in the components of the dielectric ceramic composition to facilitate deposition of the anorthite ($CaMgSi_2O_6$) crystal, which is well known to have superior chemical resistance and strength. As a result, the strength and chemical resistance of the dielectric composition are enhanced, thus allowing preparation of a large-sized, modularized board.

EXAMPLES

The examples and experiments will now be described. The following examples and experiments are for illustrative purposes only and not intended to limit the scope of this disclosure.

Preparation Examples

Preparation of Glass Frits

High-melting-point, crystallized borosilicate-based glass frits were prepared with the compositions described in Table 1 by quenching at 1500° C. Glass transition temperature ($T_g$), softening temperature ($T_s$) and electrical properties of the prepared glass frits measured using a dilatometer are also presented in Table 1.

TABLE 1

| | Composition of glass frit (mol %) | | | | | | | | Properties of glass frit (1 MHz) | | | |
|---|---|---|---|---|---|---|---|---|---|---|---|---|
| | | | | | | | | | | | Dielectric | Dielectric |
| | $SiO_2$ | $B_2O_3$ | $Al_2O_3$ | $Li_2O$ | SrO | MgO | CaO | ZnO | $T_g$(° C.) | $T_s$(° C.) | constant (k) | loss (%) |
| Prep. Ex. 1 | 66.3 | 20.7 | 1.9 | 0.3 | — | — | 9.8 | 1.0 | 612 | 703 | 4.5 | 0.08 |
| Prep. Ex. 2 | 65.3 | 17.0 | 2.0 | 0.7 | — | 3.0 | 11.0 | 1.0 | 672 | 730 | 5.2 | 0.14 |
| Prep. Ex. 3 | 70.0 | 22.0 | 2.0 | 1.0 | — | — | 5.0 | — | 512 | 588 | 4.3 | 0.12 |
| Prep. Ex. 4 | 50.0 | 20.0 | — | — | — | 10.0 | 20.0 | — | 689 | 730 | 6.3 | 0.14 |
| Prep. Ex. 5 | 50.0 | 15.0 | 2.0 | — | — | 10.0 | 20.0 | 3.0 | 677 | 722 | 6.7 | 0.12 |
| Prep. Ex. 6 | 55.0 | 17.0 | — | 1.0 | — | 2.0 | 25.0 | — | 688 | 729 | 6.4 | 0.11 |
| Prep. Ex. 7 | 50.0 | 19.7 | 1.0 | 0.3 | — | 9.0 | 20.0 | — | 670 | 733 | 6.3 | 0.16 |
| Prep. Ex. 8 | 54.0 | 20.0 | — | 0.3 | 5.0 | — | 19.7 | 1.0 | 688 | 729 | 5.8 | 0.15 |
| Prep. Ex. 9 | 50.0 | 20.0 | — | 0.5 | 5.5 | — | 23.0 | 1.0 | 660 | 715 | 6.6 | 0.17 |
| Comp. Prep. Ex. 1 | 70.0 | 20.0 | 2.0 | — | — | — | 5.0 | 3.0 | 688 | 722 | 4.6 | 0.10 |
| Comp. Prep. Ex. 2 | 65.0 | 25.0 | — | 5.0 | — | — | 3.0 | 2.0 | 610 | 646 | 6.2 | 0.23 |

As seen from Table 1, the glass frits of the present invention exhibited a dielectric constant of 4.3-6.7 and a dielectric loss of 0.08-0.17 at 1 MHz. As seen from FIG. 1, the glass frits prepared in Preparation Examples 4 and 9 show at least two different compositional regions, unlike the amorphous glass frits of Comparative Preparation Example 1 or 2 where the composition is uniform without crystallization. That is to say, crystallization occurs in the region where the content of alkaline earth metal oxides such as CaO, SrO and MgO is high, whereas sintering occurs in liquid phase in other regions due to the viscous flow. As a result of the crystallization, wollastonite ($CaSiO_3$), anorthite ($CaMgSi_2O_6$), diopside ($CaAl_2Si_2O_8$), quartz ($SiO_2$), etc. are deposited. The deposited crystal phases enhance the strength of the dielectric composition, improve its chemical resistance, quickly consume the internal pores, thereby improving fineness, and improve dielectric properties.

Examples and Comparative Examples

Sintering of Fillers and Ceramic Compositions

Fillers $(Zn_{1-x}Mg_x)_2SiO_4$ ($0<x<1$) were prepared by weighing $Zn_2SiO_4$ and $Mg_2SiO_4$ as described in Table 2. The fillers were prepared by sintering at a temperature in the range of 1300-1450° C. depending on the proportion of Zn and Mg. Pure $Zn_2SiO_4$ or $Mg_2SiO_4$ was used for the case where x is 0 or 1.

The glass frits prepared in Preparation Examples and the fillers were mixed as described in Table 2 and sintered for about 2 hours at the temperature described therein. Relative density of the sintered dielectric ceramics was measured according to the Archimedes' method. Strength was measured according to KSL 1591 by the three-point bending method. The result is shown in Table 2.

Also, dielectric constant and quality factor at 1 MHz were measured using an LCR meter after providing electrodes on both sides of the test sample. Dielectric constant and quality factor at high-frequency regions of 10 GHz and 60 GHz were measured using an HP 8720C network analyzer according to the parallel-plate method and the cavity resonance method presented by Hakki and Colemann. The result is shown in Table 3.

TABLE 2

| | $(Zn_{1-x}Mg_x)_2SiO_4$ | | $Al_2O_3$ | Glass frit | | Sintering temperature | Relative density | Strength |
|---|---|---|---|---|---|---|---|---|
| | x | wt % | wt % | | wt % | (° C.) | (%) | (MPa) |
| Ex. 1 | 0.0 | 55 | — | Prep. Ex. 1 | 45 | 875 | 98.1 | 180 |
| Ex. 2 | 0.3 | 40 | — | Prep. Ex. 1 | 60 | 850 | 97.8 | 171 |
| Ex. 3 | 0.5 | 40 | — | Prep. Ex. 1 | 60 | 850 | 97.7 | 175 |
| Ex. 4 | 0.7 | 30 | 5 | Prep. Ex. 1 | 65 | 875 | 98.3 | 200 |
| Ex. 5 | 1.0 | 30 | 10 | Prep. Ex. 1 | 60 | 900 | 98.0 | 202 |
| Ex. 6 | 0.0 | 50 | 5 | Prep. Ex. 4 | 45 | 850 | 96.9 | 225 |
| Ex. 7 | 0.3 | 47 | 3 | Prep. Ex. 4 | 50 | 825 | 96.3 | 201 |
| Ex. 8 | 0.5 | 40 | 5 | Prep. Ex. 4 | 55 | 825 | 97.0 | 215 |
| Ex. 9 | 0.7 | 40 | 5 | Prep. Ex. 4 | 55 | 850 | 96.5 | 220 |
| Ex. 10 | 1.0 | 30 | 10 | Prep. Ex. 4 | 60 | 875 | 96.5 | 207 |
| Ex. 11 | 0.3 | 60 | — | Prep. Ex. 5 | 40 | 900 | 95.8 | 198 |
| Ex. 12 | 0.3 | 50 | 5 | Prep. Ex. 5 | 45 | 875 | 96.6 | 230 |
| Ex. 13 | 0.5 | 30 | 10 | Prep. Ex. 5 | 60 | 875 | 96.5 | 244 |
| Ex. 14 | 0.3 | 57 | 3 | Prep. Ex. 8 | 40 | 900 | 96.3 | 227 |
| Ex. 15 | 0.5 | 55 | 3 | Prep. Ex. 8 | 42 | 900 | 96.5 | 225 |
| Ex. 16 | 0.5 | 50 | 5 | Prep. Ex. 8 | 45 | 850 | 96.6 | 209 |
| Ex. 17 | 0.7 | 45 | — | Prep. Ex. 8 | 55 | 850 | 97.5 | 173 |
| Ex. 18 | 0.5 | 40 | — | Prep. Ex. 9 | 60 | 800 | 97.1 | 188 |
| Ex. 19 | 0.5 | 40 | 5 | Prep. Ex. 9 | 55 | 825 | 97.0 | 215 |
| Ex. 20 | 0.7 | 40 | — | Prep. Ex. 9 | 60 | 825 | 97.0 | 200 |
| Comp. Ex. 1 | 0.3 | 65 | — | Prep. Ex. 4 | 35 | 950 | 91.3 | 140 |
| Comp. Ex. 2 | 0.3 | 20 | 10 | Prep. Ex. 5 | 70 | 850 | 98.0 | 144 |

TABLE 2-continued

| | $(Zn_{1-x}Mg_x)_2SiO_4$ | | $Al_2O_3$ | Glass frit | | Sintering temperature | Relative density | Strength |
|---|---|---|---|---|---|---|---|---|
| | x | wt % | wt % | | wt % | (° C.) | (%) | (MPa) |
| Comp. Ex. 3 | 0.5 | 15 | 10 | Prep. Ex. 5 | 75 | 850 | 98.1 | 145 |
| Comp. Ex. 4 | 0.5 | 25 | 5 | Prep. Ex. 6 | 70 | 850 | 98.1 | 130 |
| Comp. Ex. 5 | 0.7 | 62 | 3 | Prep. Ex. 9 | 35 | 950 | 91.9 | 145 |
| Comp. Ex. 6 | 0.0 | 55 | — | Comp. Prep. Ex. 1 | 45 | 875 | 96.3 | 150 |
| Comp. Ex. 7 | 1.0 | 40 | — | Comp. Prep. Ex. 2 | 60 | 900 | 95.2 | 148 |
| Comp. Ex. 8 | 1.0 | 40 | — | Comp. Prep. Ex. 2 | 60 | 900 | 97.0 | 127 |

TABLE 3

| | Dielectric constant (k) | | | Quality factor (Q) | | |
|---|---|---|---|---|---|---|
| | 1 MHz | 10 GHz | 60 GHz | 1 MHz | 10 GHz | 60 GHz |
| Ex. 1 | 5.4 | 5.6 | 5.6 | 20,000 | 1300 | 450 |
| Ex. 2 | 5.1 | 5.2 | 5.2 | 16,000 | 1020 | 400 |
| Ex. 3 | 5.0 | 5.1 | 5.2 | 12,000 | 850 | 403 |
| Ex. 4 | 5.5 | 5.7 | 5.7 | 7,000 | 810 | 400 |
| Ex. 5 | 4.6 | 4.8 | 4.8 | 5,100 | 800 | 400 |
| Ex. 6 | 6.1 | 6.3 | 6.3 | 14,700 | 1100 | 480 |
| Ex. 7 | 5.8 | 6.0 | 6.0 | 5,900 | 930 | 410 |
| Ex. 8 | 5.3 | 5.4 | 5.4 | 5100 | 800 | 400 |
| Ex. 9 | 5.2 | 5.4 | 5.4 | 5000 | 801 | 402 |
| Ex. 10 | 5.5 | 5.6 | 5.6 | 5000 | 900 | 411 |
| Ex. 11 | 6.0 | 6.2 | 6.2 | 7200 | 922 | 433 |
| Ex. 12 | 6.1 | 6.3 | 6.3 | 5400 | 901 | 403 |
| Ex. 13 | 6.0 | 6.2 | 6.2 | 5100 | 902 | 408 |
| Ex. 14 | 6.3 | 6.4 | 6.4 | 5000 | 830 | 400 |
| Ex. 15 | 6.1 | 6.3 | 6.3 | 5200 | 805 | 401 |
| Ex. 16 | 6.0 | 6.2 | 6.2 | 5000 | 801 | 400 |
| Ex. 17 | 5.8 | 6.0 | 6.0 | 5000 | 866 | 405 |
| Ex. 18 | 5.9 | 6.1 | 6.1 | 5100 | 820 | 401 |
| Ex. 19 | 5.9 | 6.1 | 6.1 | 5100 | 836 | 420 |
| Ex. 20 | 5.8 | 6.0 | 6.0 | 5000 | 811 | 405 |
| Comp. Ex. 1 | 6.4 | 6.5 | 6.5 | 750 | 650 | 250 |
| Comp. Ex. 2 | 4.2 | 4.4 | 4.4 | 920 | 480 | 210 |
| Comp. Ex. 3 | 4.6 | 4.8 | 4.8 | 880 | 400 | 270 |
| Comp. Ex. 4 | 4.5 | 4.7 | 4.7 | 850 | 410 | 255 |
| Comp. Ex. 5 | 6.1 | 6.3 | 6.3 | 1,000 | 510 | 330 |
| Comp. Ex. 6 | 5.1 | 5.2 | 5.2 | 5000 | 610 | 300 |
| Comp. Ex. 7 | 4.9 | 5.0 | 5.0 | 900 | 430 | 210 |
| Comp. Ex. 8 | 5.5 | 5.6 | 5.6 | 880 | 380 | 180 |

Figure 2:
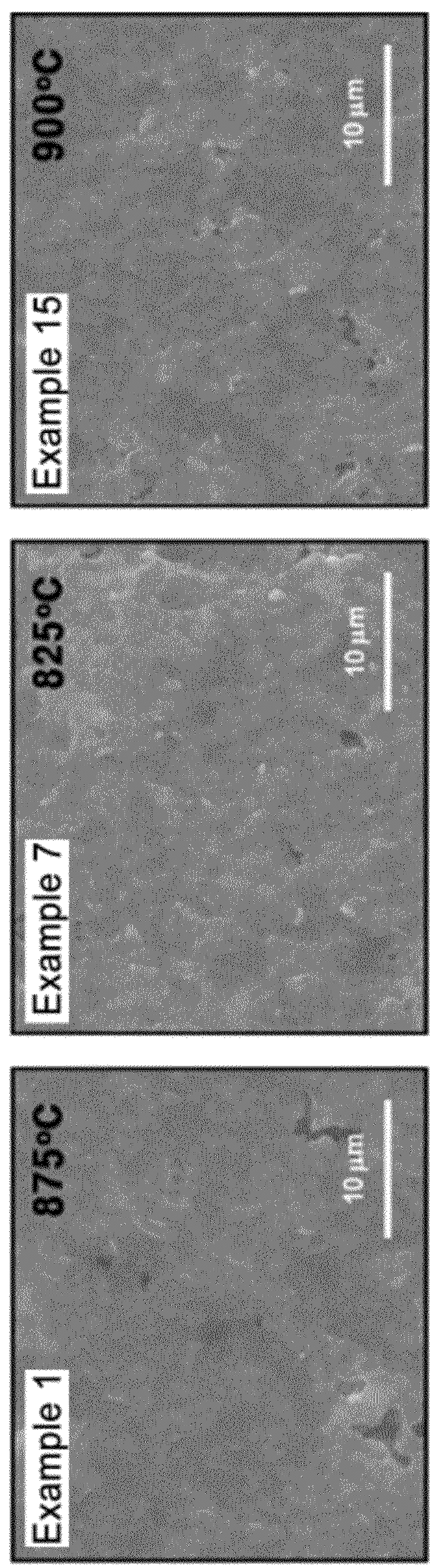
FIG. 2 shows SEM images showing the fineness of the dielectric ceramics of Examples 1, 7 and 15.

FIG. 2 shows scanning electron microscopic (SEM) images showing the fracture surface of the dielectric ceramics of Examples 1, 7 and 15, which exhibited superior sinterability, dielectric properties and strength as seen from Tables 2 and 3. As seen from FIG. 2, the dielectric ceramics showed superior fineness with few pores in the sample, which could be expected from the high relative density of 95% or higher. Also, they show optimized state with few defects such as internal cracks or isolated pores that can result from difference in the thermal expansion coefficients of the internal crystal phases, abnormal grain growth, or the like.

Figure 3:
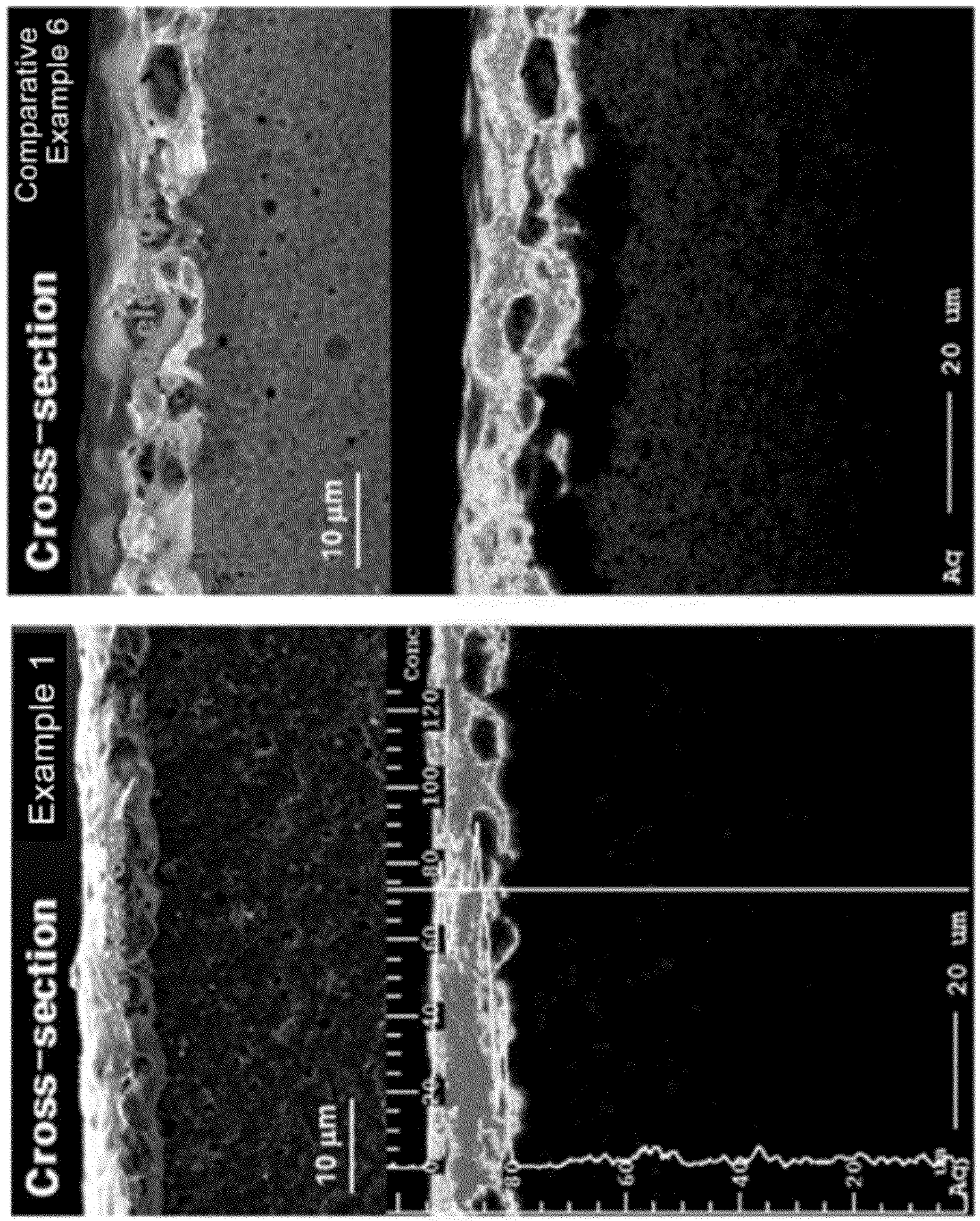
FIG. 3 compares the degree of electrode diffusion of the dielectric ceramics of Example 1 and Comparative Example 6.

Plating resistance and degree of electrode diffusion were tested for the samples of Example 1 and Comparative Example 6. The sample of Comparative Example 6 wherein the glass frit did not show crystallization showed chemical resistance problem. When the samples were immersed in the plating solution, the sample of Example 1 showed little change in weight, whereas the sample of Comparative Example 6 showed a weight decrease by about 7%. And, as seen from FIG. 3, the sample of Example 1 wherein crystallization occurred during the sintering showed little electrode diffusion, whereas that of Comparative Example 6, wherein the general borosilicate glass frit with no crystallization was used, showed distinct electrode diffusion. Especially in the high frequency region, such electrode diffusion leads to reduction of the Q value, which can be clearly seen from the dielectric properties at 10 GHz and 60 GHz in Table 3.

An adequate amount of the $(Zn_{1-x}Mg_x)_2SiO_4$ ($0 \leqq x \leqq 1$) ceramic filler to be added was 30-60 wt %. As seen from Table 2, when the amount of the filler added exceeded 60 wt % (Comparative Examples 1 and 5), the samples sintered at 900° C. or below did not show satisfactory fineness, with a relative density of 95% or less. And, when the filler was added in an amount less than 30 wt %, the $(Zn_{1-x}Mg_x)_2SiO_4$ ($0 \leqq x \leqq 1$) phase providing superior dielectric properties disappeared and the quartz ($SiO_2$) phase appeared instead. Since the quartz ($SiO_2$) phase provides unsatisfactory strength and dielectric properties as compared to the $(Zn_{1-x}Mg_x)_2SiO_4$ ($0 \leqq x \leqq 1$) phase, strength and dielectric properties were degraded.

Since the low-dielectric-constant dielectric ceramic composition for millimeter-wave application of the present invention is useful as a material for transceiver modules of 60-GHz wireless HDMI, HDTV, car radar, or the like for complex and various multimedia services including video broadcasting, video telephone and file transfer in the 60-, 77- and 94-GHz broadband, its market is expected to have a continual growth.

The present invention has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A dielectric ceramic composition comprising:

40-70 wt % of a borosilicate-based glass frit comprising 50-80 mol % of $SiO_2$, 15-20 mol % of $B_2O_3$, 0.1-5 mol % of one or more alkali metal oxide selected from $Li_2O$ and $Na_2O$, and 0.1-30 mol % of one or more alkaline earth metal oxide selected from MgO, CaO, SrO and ZnO; and 30-60 wt % of a ceramic filler represented by Chemical Formula 1:

$$(Zn_{1-x}Mg_x)_2SiO_4 \quad (1)$$

wherein $0<x<1$.

2. The dielectric ceramic composition according to claim 1, wherein the borosilicate-based glass frit further comprises 0.1-5 mol % of $Al_2O_3$.

3. The dielectric ceramic composition according to claim 1, wherein the dielectric ceramic composition further comprises 0.1-15 parts by weight of $Al_2O_3$ based on 100 parts by weight of the dielectric ceramic composition.

4. A dielectric ceramic composition consisting of:

40-70 wt % of a borosilicate-based glass frit comprising 50-80 mol % of $SiO_2$, 15-20 mol % of $B_2O_3$, 0.1-5 mol % of one or more alkali metal oxide selected from $Li_2O$ and $Na_2O$, and 0.1-30 mol % of one or more alkaline earth metal oxide selected from MgO, CaO, SrO and ZnO; and 30-60 wt % of a ceramic filler represented by Chemical Formula 1:

$$(Zn_{1-x}Mg_x)_2SiO_4 \quad (1)$$

wherein $0 \leqq x \leqq 1$.

5. The dielectric ceramic composition according to claim 4, wherein $0 < x < 1$.

* * * * *